(12) United States Patent
Bea (10) Patent No.: US 10,630,479 B2
(45) Date of Patent: Apr. 21, 2020

(54) NETWORK COMMUNICATION METHOD HAVING FUNCTION OF RECOVERING TERMINAL SESSION

(71) Applicant: NETTENTION CO., LTD., Seoul (KR)

(72) Inventor: Hyun-Jik Bea, Seoul (KR)

( * ) Notice: Subject to any disclaimer, the term of this patent is extended or adjusted under 35 U.S.C. 154(b) by 123 days.

(21) Appl. No.: 15/541,482

(22) PCT Filed: Jan. 21, 2015

(86) PCT No.: PCT/KR2015/000615
§ 371 (c)(1),
(2) Date: Jul. 4, 2017

(87) PCT Pub. No.: WO2016/111407
PCT Pub. Date: Jul. 14, 2016

(65) Prior Publication Data
US 2017/0359178 A1    Dec. 14, 2017

(30) Foreign Application Priority Data

Jan. 8, 2015    (KR) ........................ 10-2015-0002614

(51) Int. Cl.
*H04L 29/06*    (2006.01)
*H04L 9/32*    (2006.01)
(Continued)

(52) U.S. Cl.
CPC .......... *H04L 9/3226* (2013.01); *H04L 9/0825* (2013.01); *H04L 9/0838* (2013.01);
(Continued)

(58) Field of Classification Search
CPC ....... H04L 9/3226; H04L 9/0838; H04L 9/12; H04L 63/0435; H04L 43/0829
See application file for complete search history.

(56) References Cited

U.S. PATENT DOCUMENTS 5,517,668 A * 5/1996 Szwerinski ............. G06F 9/544
709/201
6,510,144 B1 * 1/2003 Dommety ............. H04W 36/18
370/328

(Continued)

FOREIGN PATENT DOCUMENTS

KR    10-2006-0120035    11/2006
KR    10-2010-0133882    12/2010
(Continued)

OTHER PUBLICATIONS

English translation of 10-2006-0120035.
(Continued)

*Primary Examiner* — Matthew T Henning
(74) *Attorney, Agent, or Firm* — Antonio Ha & U.S. Patent, LLC (57) ABSTRACT

A network communication method comprises connecting, by a server and client, through networks and sharing a symmetric key, generating, by the server, a credential by which the client can be identified, through random number generation, and sharing the credential with the client, generating, by the client, transmission data containing a serial number indicating the sequence of the transmission data, and transmitting a message to the server, and generating, by the server, transmission data containing a serial number indicating the sequence of the transmission data, and transmitting a message to the client.

4 Claims, 8 Drawing Sheets

(51) Int. Cl.
*H04L 9/14* (2006.01)
*H04L 9/12* (2006.01)
*H04L 9/08* (2006.01)
*H04L 29/08* (2006.01)

(52) U.S. Cl.
CPC .............. *H04L 9/0869* (2013.01); *H04L 9/12* (2013.01); *H04L 9/14* (2013.01); *H04L 63/0435* (2013.01); *H04L 63/062* (2013.01); *H04L 63/168* (2013.01); *H04L 67/141* (2013.01); *H04L 67/145* (2013.01); *H04L 67/42* (2013.01); *H04L 2463/062* (2013.01)

(56) References Cited

U.S. PATENT DOCUMENTS

| | | | | |
|---|---|---|---|---|
| 2005/0198379 A1* | 9/2005 | Panasyuk | ................ | G06F 21/31 709/239 |
| 2010/0228982 A1* | 9/2010 | Zhu | ...................... | H04L 9/3271 713/175 |

FOREIGN PATENT DOCUMENTS

| | | |
|---|---|---|
| KR | 10-2013-0010522 | 1/2013 |
| KR | 10-2014-0036345 | 3/2014 |

OTHER PUBLICATIONS

English translation of 10-2013-0010522.
English translation of 10-2014-0036345.
English translation of 10-2010-0133882.

\* cited by examiner

NETWORK COMMUNICATION METHOD HAVING FUNCTION OF RECOVERING TERMINAL SESSION

TECHNICAL FIELD

The present disclosure relates to a network communication method having a function of recovering a terminal session, and more particularly, to a network communication method having a function of recovering a terminal session, which can automatically recover a connection within a short time, using a credential for identifying a connection terminal in a network environment between a server and client and a serial number indicating a data transmission sequence, while a user does not recognize a disconnection which occurs between networks.

BACKGROUND ART

Recently, with the development and diversification of communication devices, the number of users in a network environment has rapidly increased. In a complex network environment, however, a server may have a functional limitation in processing and responding to messages transmitted from clients. Thus, in order to smoothly perform message interactions with an infinite number of clients, a distributed server system including a plurality of servers has been mostly used.

In order to increase the distribution efficiency of the distributed server system, research has been continuously conducted on a distributed server system as disclosed in Korean Patent Publication No. 10-2000-7009397.

In the conventional network technology, however, when trying to reconnect to a disconnected server, a user must newly go through a user authentication process. Furthermore, even when a user tries to reconnect to the disconnected server using an ID and password which are previously stored therein, an excessive reconnection time may be required by the user authentication process.

Furthermore, when a disconnection occurs, data which are not yet transmitted until a user reconnects to the server after the disconnection may be lost.

Thus, when a disconnection occurs between a server and a client, the conventional network technology not only requires a reconnection process and a re-authentication process, but also requires a separate recovery process for data loss.

DISCLOSURE

Technical Problem

Various embodiments are directed to a network communication method having a function of recovering a terminal session, which can automatically recognize a terminal and recover a connection without a separate terminal authentication process, using a credential for identifying a connection terminal in a network environment between a server and client, when the connection between the server and client is interrupted.

Also, various embodiments are directed to a network communication method having a function of recovering a terminal session, which can assign a serial number indicating the sequence of data transmitted in a network environment between a server and client and retransmit non-received data when a connection between the server and client is interrupted, thereby preventing a data loss.

Further, various embodiments are directed to a network communication method having a function of recovering a terminal session, which can transfer a connection of a terminal to another server in a similar manner to a reconnection recovery process, while a user does not recognize an interruption.

Technical Solution

In an embodiment, a network communication method having a function of recovering a terminal session may include the steps of: (A) connecting, by a server and client, through networks and sharing a symmetric key; (B) generating, by the server, a credential by which the client can be identified, through random number generation, and sharing the credential with the client; (C) generating, by the client, transmission data containing a serial number indicating the sequence of the transmission data, and transmitting a message to the server; and (D) generating, by the server, transmission data containing a serial number indicating the sequence of the transmission data, and transmitting a message to the client.

The step (B) may include the steps of: (B1) generating, by the server, a random number block, and storing the generated random number block as the credential of the corresponding client; and (B2) encrypting the credential using the shared symmetric key, and transmitting the encrypted credential to the client to share the credential.

The step (C) may include the steps of: (C1) generating packets for the message to be transmitted by the client; (C2) generating the transmission data containing the serial number by assigning the serial number to each of the generated packets; and (C3) transmitting the transmission data to the server, and then counting the serial number.

The step (D) may include the steps of: (D1) generating packets for the message to be transmitted by the server; (D2) generating the transmission data containing the serial number by assigning the serial number to each of the generated packets; and (D3) transmitting the transmission data to the client, and then counting the serial number.

The serial number may be set on a message basis.

The serial number may be set on a packet basis.

The network communication method may further include the steps of: (E) reconnecting, by the client, to the server and sharing a new symmetric key, after the connection between the client and the server is interrupted; (F) transmitting, by the client, a credential stored therein to the server; (G) performing, by the client and server, a message transmission/reception synchronization process to share non-received messages before the connection interruption; and (H) performing, by the client and server, a message transmission/reception process after the message transmission/reception synchronization process is done.

The step (G) may include the steps of: (G1) comparing, by the server, the credential received from the client to credentials stored therein, and checking the client of a credential which coincides with the credential received from the client; (G2) checking the serial number of the final transmission data received from the checked client before the connection interruption, and transmitting the final serial number to the client; and (G3) retransmitting non-received transmission data to the server, by the client receiving the final serial number.

The step (G) may include the steps of: (G1) comparing, by the server, the credential received from the client to credentials stored therein, and checking the client of a credential which coincides with the credential received from the client;

(G2) checking, by the client, the serial number of the final transmission data received from the server before the connection interruption, and transmitting the final serial number to the server; and (G3) retransmitting non-received transmission data to the client, by the server receiving the final serial number.

The network communication method may further include the steps of: (E) transmitting, by the server, a session transfer message to a second server, the session transfer message indicating that the server having communicated with the client will transfer a session to the second server; (F) transmitting, by the second server, an acknowledge message to the server; (G) transmitting, by the server, an access server change message to the client, the access server change message instructing the client to change the access server to the second server; (H) connecting, by the client, to the second server and sharing a new symmetric key with the second server; (I) transmitting, by the client, a credential stored therein to the second server; (J) performing, by the client and the second server, a message transmission/reception synchronization process to share non-received messages before the connection interruption from the server; and (K) performing, by the client and the second server, a message transmission/reception process after the message transmission/reception synchronization process is done.

The session transfer message may include a credential and a serial number.

The step (J) may include the steps of: (J1) comparing, by the second server, the credential received from the client to the credential received from the server, and checking whether the client is the client of which the session was transferred to the second server; (J2) transmitting the serial number of the final transmission data received from the server to the client of which the session was transferred; and (J3) retransmitting non-received transmission data to the second server, by the client receiving the final serial number.

The step (J) may include the steps of: (J1) comparing, by the second server, the credential received from the client to the credential received from the server, and checking whether the client is the client of which the session was transferred to the second server; (J2) transmitting the serial number of the final transmission data to the second server, by the client of which the session was transferred to the second server; and (J3) retransmitting non-received transmission data to the client, by the second server receiving the final serial number.

Advantageous Effects

As described above, the network communication method having a function of recovering a terminal session can expect the following effects.

The network communication method can automatically recover a connection without a separate terminal authentication process, using a credential for identifying a connection terminal in a network environment between a server and client, when a connection between the server and client is interrupted.

The network communication method can assign a serial number indicating the sequence of data transmitted in a network environment between a server and client, and retransmit non-received data when a connection between the server and client is interrupted, thereby preventing a data loss.

Thus, the network communication method can recover a connection between a server and client, while a user does not recognize an interruption after the connection is interrupted.

The network communication method can recover a connection between a server and client such that a user does not recognize an interruption, while a session of a terminal connected to a server of a distributed server system through a reconnection recovery process is transferred to another server.

BEST MODE FOR INVENTION

A network communication method having a function of recovering a terminal session may include the steps of: (A) connecting, by a server and client, through networks and sharing a symmetric key; (B) generating, by the server, a credential by which the client can be identified, through random number generation, and sharing the credential with the client; (C) generating, by the client, transmission data containing a serial number indicating the sequence of the transmission data, and transmitting a message to the server; and (D) generating, by the server, transmission data containing a serial number indicating the sequence of the transmission data, and transmitting a message to the client.

Mode for Invention

Hereafter, a network communication method having a function of recovering a terminal session according to an embodiment of the present invention will be described in detail with reference to the accompanying drawings.

First, a network communication system having a function of recovering a terminal session according to an embodiment of the present invention will be described in detail with reference to FIG. 2.

Figure 1:
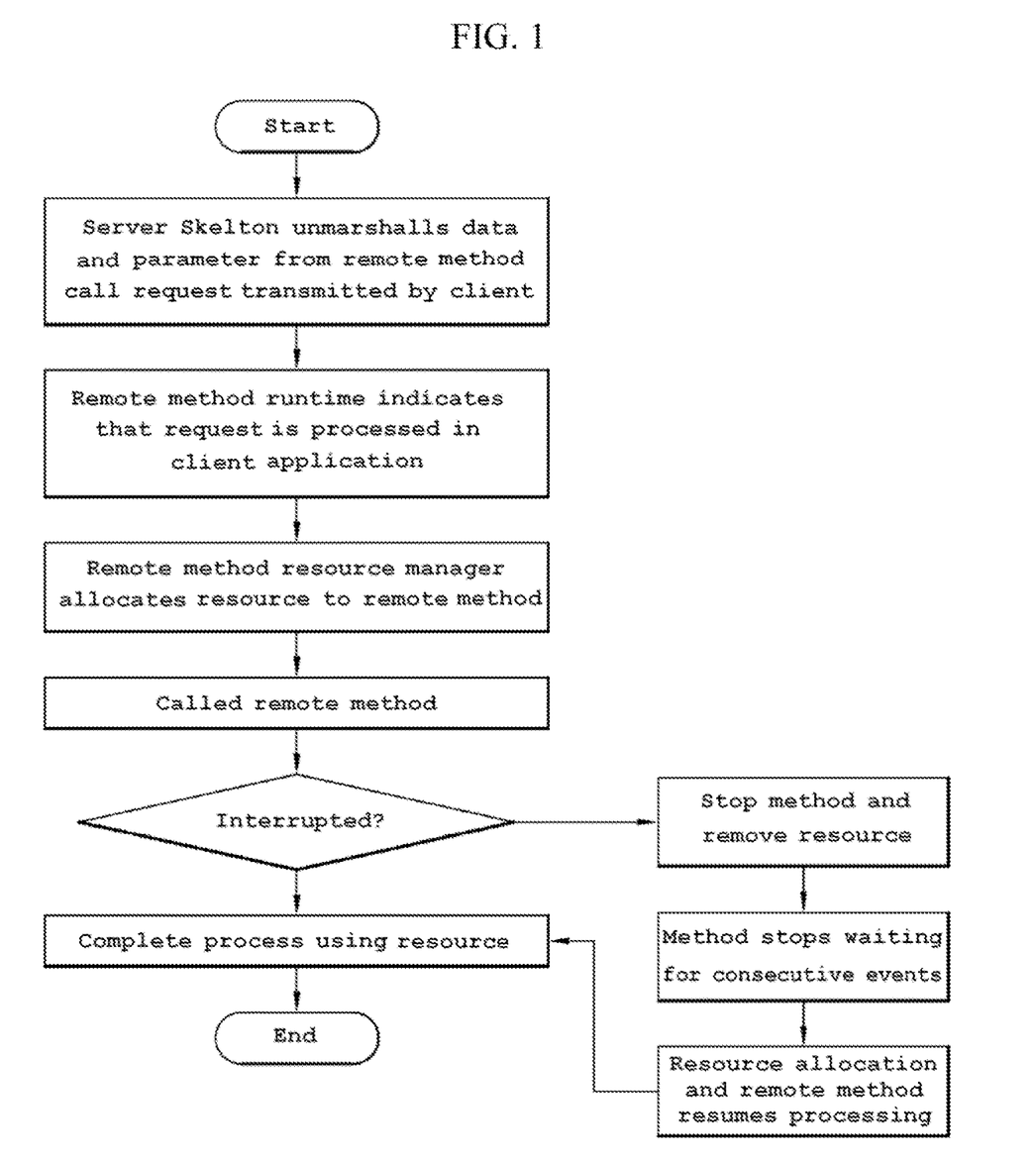
FIG. 1 is a flowchart illustrating steps of performing message transmission according to the related art.
Figure 2:
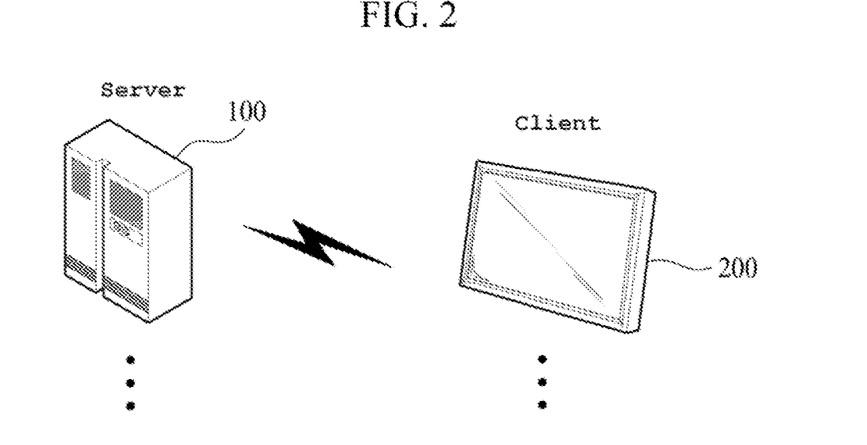
FIG. 2 is a block diagram illustrating a network communication system having a function of recovering a terminal session according to an embodiment of the present invention.

As illustrated in FIG. 2, the network communication system having a function of recovering a terminal session according to the embodiment of the present invention includes a server 100 and a client 200. At this time, the server 100 may be implemented as a distributed server system including a plurality of servers 100.

The client 200 may indicate a plurality of clients 200 connected to the server 100.

Thus, when excessive traffic is generated in a channel of a specific server 100 while the client 200 is connected to the distributed server system, the client 200 may have to transfer and reconnect to another server 100.

Such a distributed server system is frequently used as game servers. For example, the client 200 may exchange data with other clients 200 connected to the server 100 while executing the same game with the clients 200 through the server 100.

Hereafter, a network communication method having a function of recovering a terminal session according to an embodiment of the present invention will be described with the accompanying drawings.

First, referring to FIGS. 3 to 5, a process in which the client 200 initially connects to the server 100 and transmits/receives data will be described.

Figure 3:
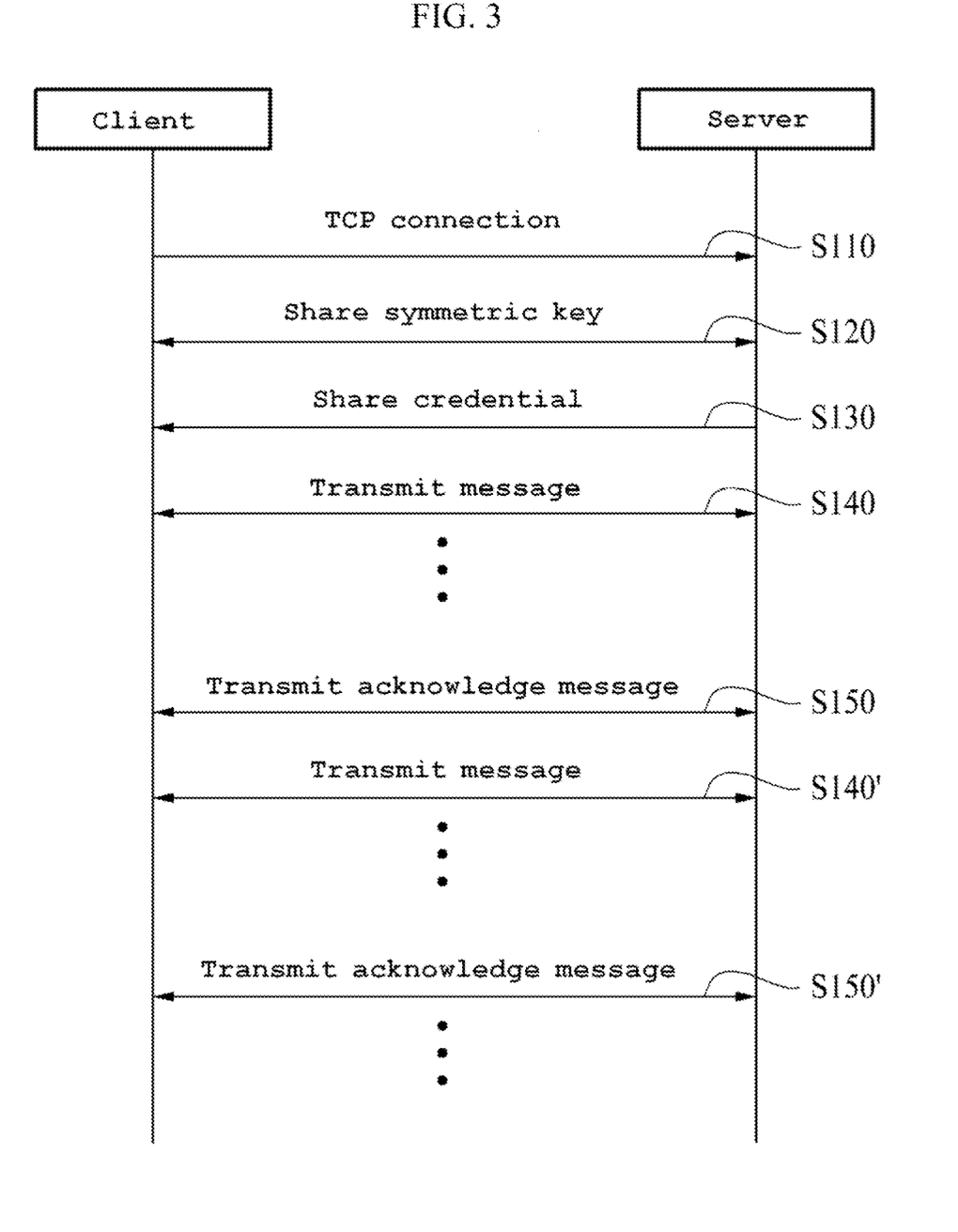
FIG. 3 is a data flowchart illustrating a connection and data transmission process between a client and server, in a network communication method according to an embodiment of the present invention.
Figure 4:
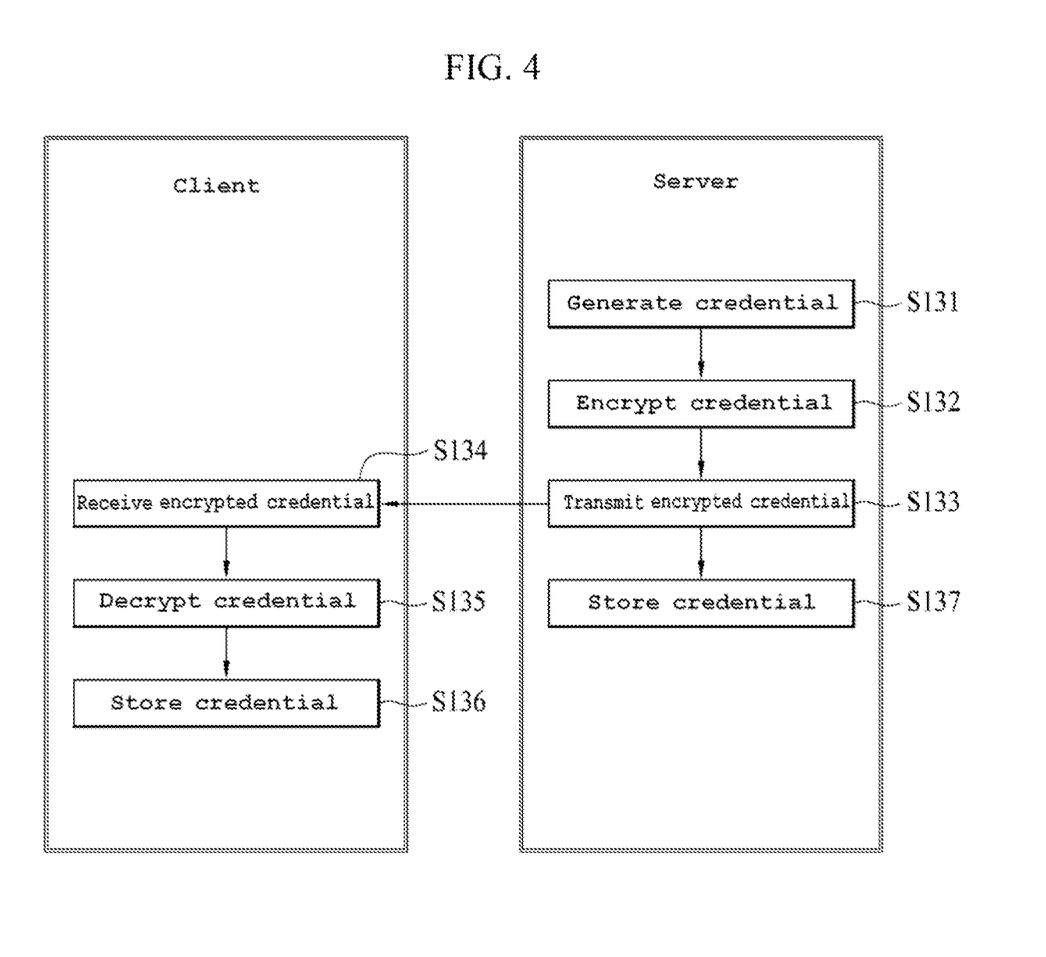
FIG. 4 is a flowchart illustrating a credential sharing process according to the embodiment of the present invention.

FIG. 3 is a data flowchart illustrating a connection and data transmission process between a client and server, in the network communication method according to the embodiment of the present invention. FIG. 4 is a flowchart illustrating a credential sharing process according to the embodiment of the present invention. FIG. 5 is a flowchart illustrating a message transmission/reception process according to the embodiment of the present invention.

Hereafter, the connection and data transmission process between the client and server according to the embodiment of the present invention will be described in detail with reference to FIG. 3.

The connection and data transmission process between the client and server in the network communication method according to the embodiment of the present invention starts with step S110 in which the client 200 requests a TCP connection from the server 100.

Then, the server 100 and the client 200 are connected to each other, and share a symmetric key through SSH (Secure Shell) or another encryption process, at step S120.

For example, when the server 100 transmits its public key to the client 200, the client 200 generates a symmetric key using a private key, encrypts the symmetric key using the public key received from the server 100, and transmits the encrypted symmetric key to the server 100. The server 100 acquires the symmetric key by decrypting the encrypted symmetric key using its private key.

Since the server 100 and the client 200 can share the symmetric key according to a variety of publicly known encryption schemes, the detailed descriptions of the sharing method are omitted herein.

After sharing the symmetric key, the server 100 generates a credential and transmits the generated credential to the client 200 at step S130. The credential indicates a two-byte or more random number data block which is used as an identifier for identifying each of the clients 200 connected to the server 100.

Hereafter, referring to FIG. 4, the credential generation and providing process will be described in detail.

The credential sharing process starts with step S131 in which the server 100 generates a prescribed length of random number block, and designates the generated random number block as the credential of the corresponding client 200.

Then, the server 100 encrypts the generated credential using the symmetric key at step S132, transmits the encrypted credential to the client 200 at step S133, and stores the credential at step S137.

When receiving the encrypted credential at step S134, the client 200 decrypts the credential using the shared symmetric key at step S135, and stores the credential at step S136.

Through such a sharing process, the client 200 and the server 100 share the credential through which the client 200 can be recognized.

Then, after the credential is shared, messages are transmitted/received between the server 100 and the client 200 according to a typical message transmission/reception scheme, at step S140. During the message transmission/reception process according to the embodiment of the present invention, a transmission data packet including a serial number is generated. This process will be described in detail with reference to FIG. 5.

Figure 5:
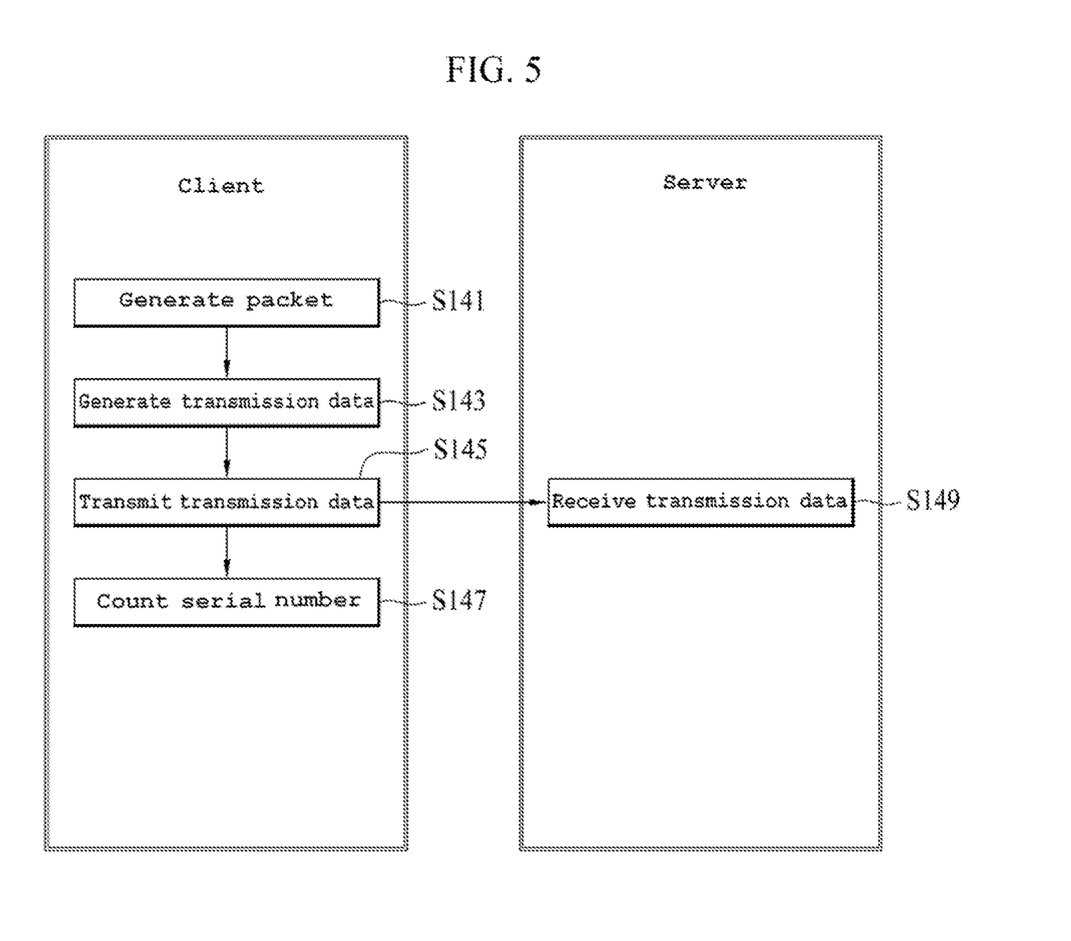
FIG. 5 is a flowchart illustrating a message transmission/reception process according to the embodiment of the present invention.

As illustrated in FIG. 5, the client 200 intended to transmit a message generates a data packet by dividing the corresponding message into transmission/reception units depending on a communication protocol, at step S141. At this time, the data packet includes a sequence number indicating the configuration sequence of the corresponding packet. Since the sequence number is based on the communication protocol, the detailed descriptions thereof are omitted herein.

In the present embodiment, the client 200 generates transmission data by assigning a serial number to each of the packets, at step S143.

At this time, the serial number may include a serial number indicating the sequence of transmission data, a serial number for identifying a unit message, and a serial number indicating a number assigned to each of transmitted packets.

For example, when the serial number is set on a message basis, 1 is assigned to all of the serial number in packets for the first message, and 2 is assigned to all of the serial number in packets for the second message.

On the other hand, when the serial number is set as a serial number for each packet, sequential numbers are assigned to the entire packets which are communicated after connection, regardless of the message sequence.

Then, the client 200 transmits the transmission data including the serial number to the server 100 at step S145, and the server 100 receives and processes the transmission data at step S149.

The client 200 counts the serial number after transmitting the transmission data, at step S147.

In this case, when the serial number indicates the sequence of a unit message, the client 200 counts the serial number on a message basis, and when the serial number indicates the sequence of a transmitted unit packet, the client 200 counts and stores the serial number whenever transmitting a packet.

Then, the server 100 transmits an acknowledge message for acknowledging the last received message to the client 200 at each preset time, at step S150. Through this process, the client 200 can check a message number received at the point of time that the server 100 transmits the acknowledge message.

As illustrated in FIG. 3, the message may be not only transmitted to the server 100 from the client 200, but also transmitted to the client 200 from the server 100.

At this time, a serial number may also be assigned to the message transmitted to the client 200 from the server 100, as described above at steps S141 to S149.

As described above, the serial number may include a serial number indicating the sequence of transmission data, a serial number for identifying a unit message, and a serial number indicating a number assigned to each of transmitted packets.

The server 100 also counts the serial number when transmitting the transmission data, and the client 200 transmits an acknowledge message for acknowledging the last received message to the server 100 at preset time.

Through this process, the server 100 can also check a message number received at the point of time that the client 200 transmits the acknowledge message.

The message transmission process S140 and the acknowledge message transmission process S150 are continuously performed while the connection between the client 200 and the server 100 is maintained.

Figure 6:
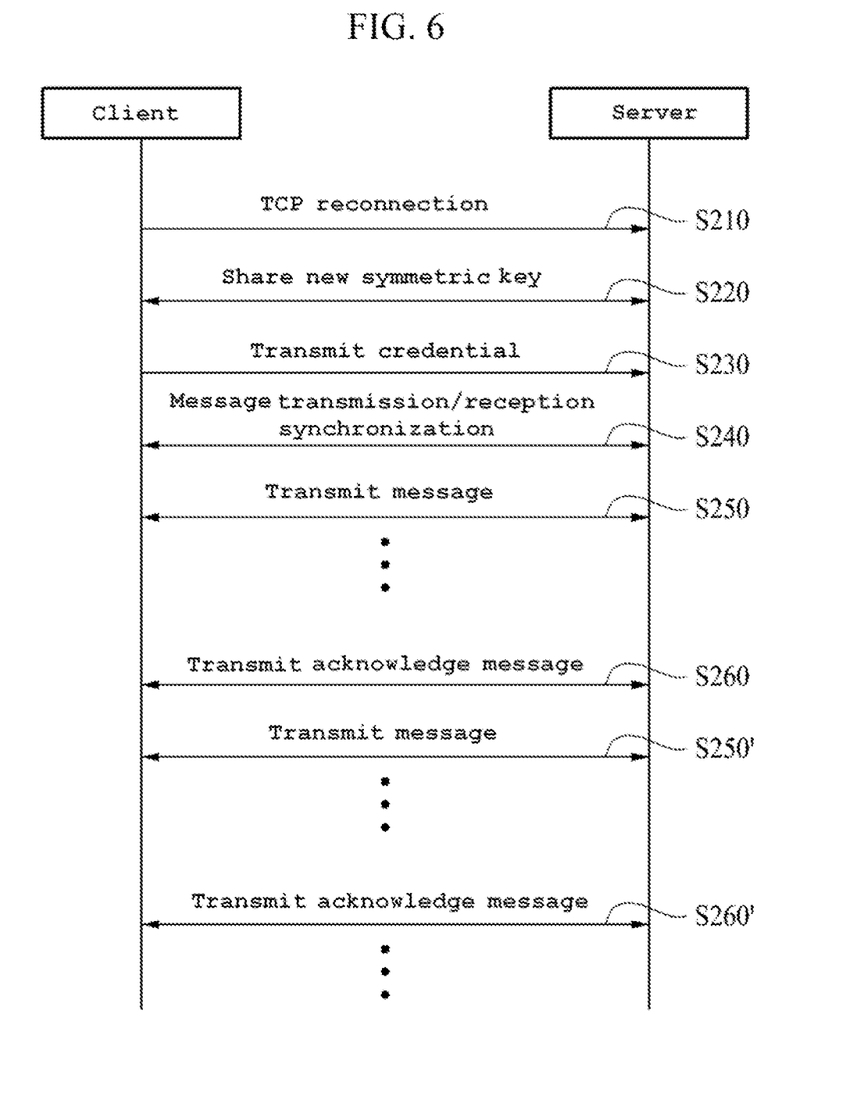
FIG. 6 is a data flowchart illustrating a connection recovery process between a client and server, in the network communication method according to the embodiment of the present invention.

Hereafter, a connection recovery process between the client 200 and the server 100 in the network communication method according to the present embodiment will be described in detail with reference to FIG. 6.

When the connection between the server 100 and the client 200 is unexpectedly interrupted, the client 200 requests a TCP connection from the server 100 again at step S210.

At this time, the case in which the connection between the server 100 and the client 200 is interrupted may be described in detail as follows. When no response message is received for a specific time while transmission data are continuously transmitted to the server 100, the client 200 considers that the connection is closed.

At this time, the client 200 cannot accurately recognize which transmission data the server 100 received.

Then, the server 100 and the client 200 share a new symmetric key according to the same method as the above-described step S120, at step S220.

The client 200 encrypts the credential stored therein using the new symmetric key, and transmits the encrypted credential to the server 100, at step S230.

The server 100 checks the received credential, and performs a message transmission/reception synchronization process, at step S240.

The message transmission/reception synchronization process refers to a process of recovering a connection between the client 200 and the server 100 by synchronizing transmitted data and received data with a point of time before the connection is cut off. The message transmission/reception synchronization process will be described in detail with reference to FIG. 7.

Figure 7:
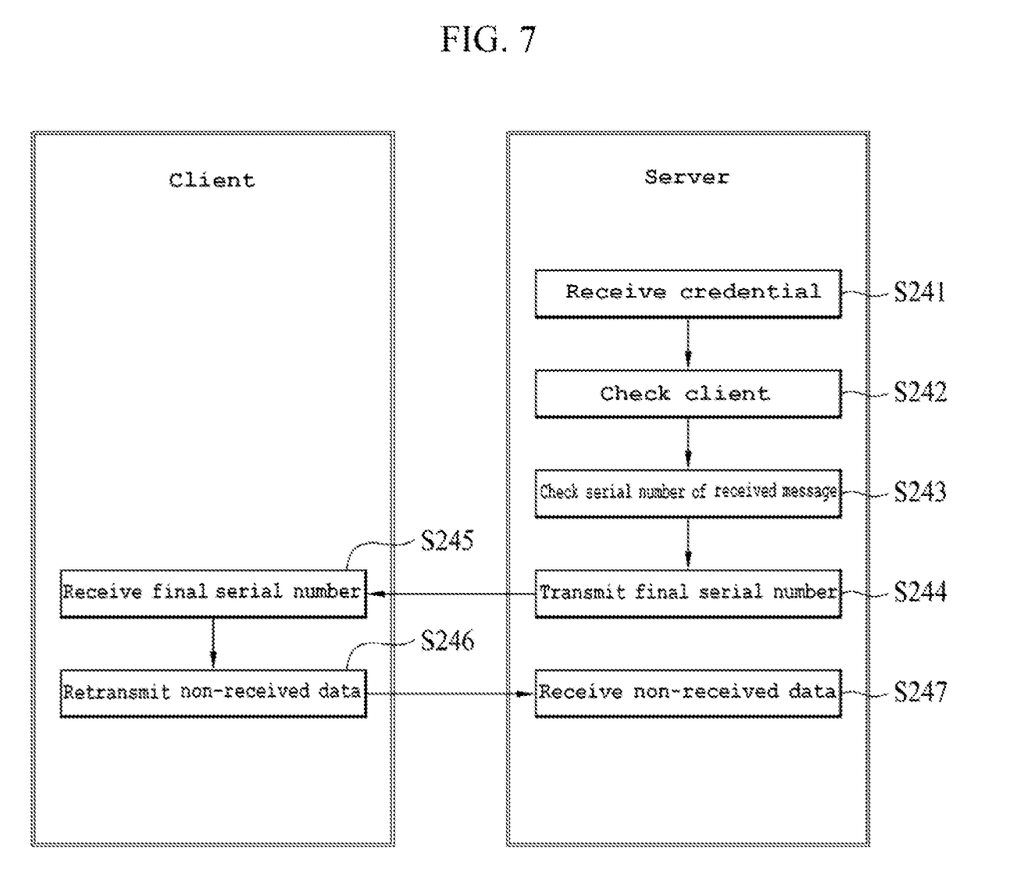
FIG. 7 is a flowchart illustrating a message transmission/reception synchronization process according to the embodiment of the present invention.

As illustrated in FIG. 7, the message transmission/reception synchronization process starts with step S241 in which the server 100 receives the credential from the client 200.

The server 100 compares the received credential to credentials stored therein. When the same credential as the received credential is present among the stored credentials, the server 100 determines that the client 200 is the client 200 which has connected before, at step S242.

Then, the server 100 checks the serial number of the final transmission data among the transmission data received from the client 200 before the interruption, at step S243. The server 100 transmits the checked final serial number to the client 200 at step S244.

When receiving the final serial number at step S245, the client 200 retransmits non-received transmission data following the final serial number, at step S246. When the server 100 receives non-received transmission data at step S247, the synchronization process is done, and the connection between the client 200 and the server 100 is recovered.

During the message transmission/reception synchronization process, the server 100 may retransmit non-received transmission data to the client 200. In this case, the client 200 may check the serial number of the final transmission data among transmission data received from the server 100 before the interruption, and transmit the checked serial number to the server 100. Then, the server 100 may retransmit the non-received transmission data to the client 200. That is, the series of processes may be performed in the same manner as described above.

The message transmission process S250 and the acknowledge message transmission process S260 are performed in the same manner as the above-described steps S140 and S150.

Through the above-described connection recovery process, the client 200 can not only automatically reconnect to the server using the credential, without a separate authentication process after a connection interruption, but also retransmit non-received transmission data, thereby preventing a data loss.

Thus, even while a user of the client 200 does not recognize the connection interruption and the recovery process, the client 200 can be reconnected to the server 100. The network communication method having the above-described effect can also be utilized when a session is transferred on a distributed server system.

For example, in a server system including a plurality of distributed servers 100, a large number of users may be connected to a specific server 100, and a small number of users may be connected to another server 100. In this case, the server system needs to transfer the session of the client 200 connected to the busy server 100 to another server 100, in order to improve the utilization efficiency of the busy server 100.

At this time, when selecting the conventional method, the server system must close the connection of the client 200, and reconnect the client 200 to another server 100 through a separate process. However, when using the network communication method according to the present embodiment, the server system can transfer the session of the client 200 to another server 100 while a user does not recognize a connection interruption and a recovery process.

Figure 8:
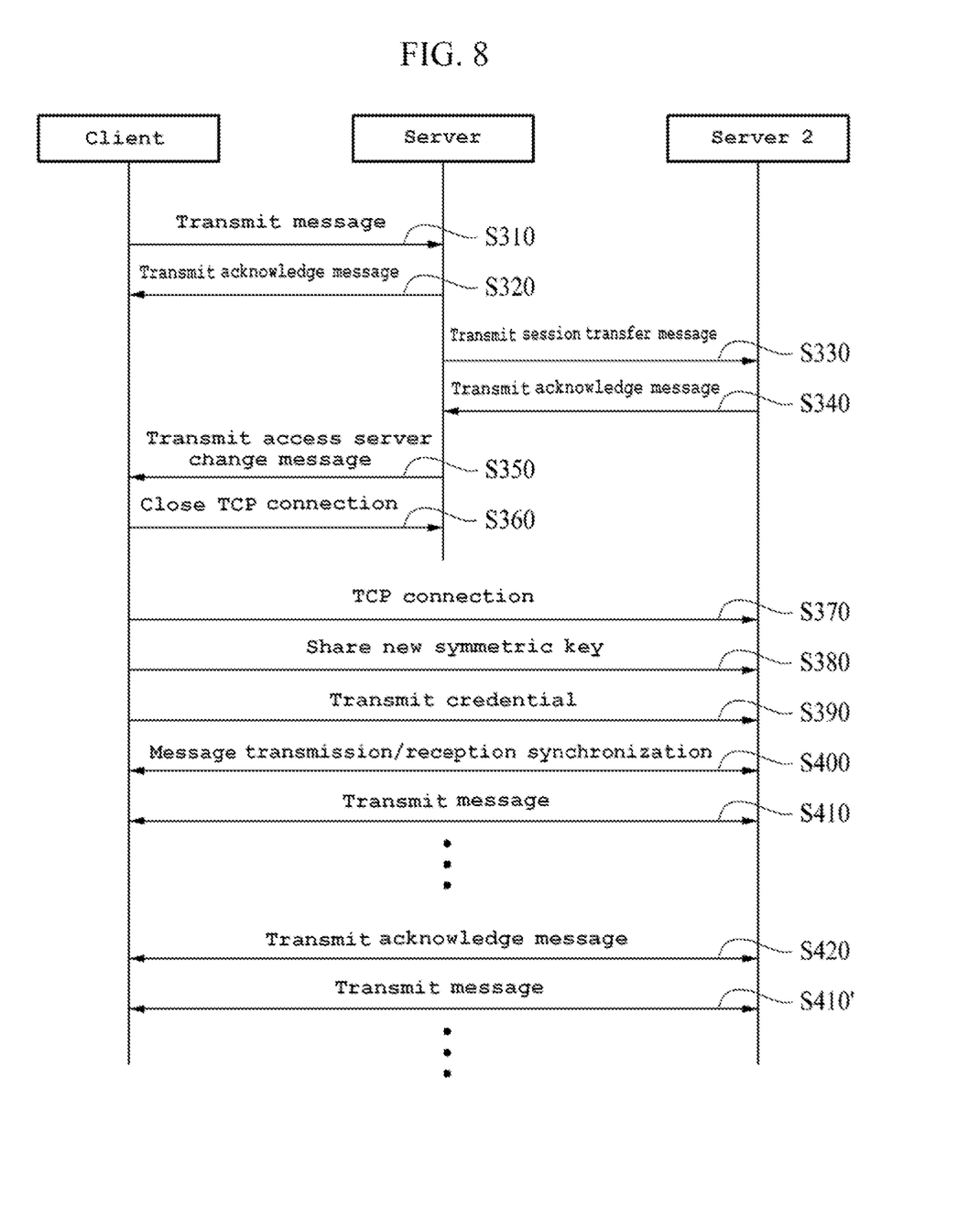
FIG. 8 is a data flowchart illustrating a client session transfer process of a server, in the network communication method according to the embodiment of the present invention.

Hereafter, an embodiment in which the network communication method is applied to a client session transfer process of a server will be described with reference to FIG. 8.

The client session transfer process of the server according to the present embodiment starts while the client and server are connected to each other and performs a message transmission/reception process, at step S320.

When intended to transfer the connection of the client to a server 2 while the message transmission/reception process is performed, the server transmits a session transfer message to transfer the session of the client to the server 2, at step s330.

The session transfer message may include a serial number included in the last transmission data received from the client and the credential shared by the client.

At this time, the session transfer message may further messages received after the acknowledge message that the server finally transmitted and user defined data dedicated to the client, in order to secure the transfer stability.

The server 2 receiving the session transfer message transmits an acknowledge message to the server, the acknowledge message indicating that the server 2 received the session transfer message, at step S340.

Then, the server transmits an access server change message to the client, the access server change message instructing the client to change the access server to the server 2, at step S350.

The client receiving the access server change message closes the TCP connection with the server at step S360.

Then, when the client requests a TCP connection from the server 2 at step S370, the server 2 and the client share a new symmetric key in the same manner as the above-described step S220, at step S380.

When the client encrypts the credential stored therein using the new symmetric key and transmits the encrypted credential to the server 2 at step S390, the server 2 compares the received credential to the credential received from the server. When the received credential is identical to the credential received from the server, the server 2 determines that the client is the client of which the session was transferred from the server, and recovers the connection by performing the message transmission/reception process, at step S400.

The message transmission process S410 and the acknowledge message transmission process S420 are performed in the same manner as the above-described steps S140 and S150.

The scope of the present invention is not limited to the above-described embodiments but defined as described in claims, and it is apparent to those skilled in the art that various modifications and variations can be made within the scope of right described in claims.

INDUSTRIAL APPLICABILITY

The present invention relates to a network communication method having a function of recovering a terminal session, and more particularly, to a network communication method having a function of recovering a terminal session, which can automatically recover a connection within a short time, using a serial number indicating a data transmission sequence and a credential for identifying a connection terminal in a network environment between a server and client, while a user does not recognize a disconnection which occurs between networks. The network communication method can automatically recover a connection using a credential for identifying a connection terminal in a network environment between a server and client, without a separate authentication process for a reconnected terminal, when a connection between a server and client is interrupted.

The invention claimed is:

1. A network communication method for transferring a terminal session, comprising:
    connecting, by a server and a client, through a network and sharing a symmetric key;
    generating, by the server, a credential by which the client can be identified, through random number generation, the credential being a two-byte or more random number block for identifying the client connected with the server, and the credential encrypted with the symmetric key;
    sharing, by the server, the credential with the client;
    generating, by the client, at least one message each including a plurality of data packets, and transmitting the at least one message to the server, serial numbers sequentially and separately assigned to the plurality of data packets, and the serial numbers differing per message or per packet;
    generating, by the server, at least one message each including plurality of data packets, and transmitting the at least one message to the client, serial numbers sequentially and separately assigned to the plurality of data packets, and the serial numbers differing per message or per packet;
    reconnecting, by the client, to the server and sharing a new symmetric key, after the connection between the client and the server is interrupted;
    encrypting the credential of the client with the new symmetric key;
    transmitting, by the client, the encrypted credential of the client to the server;
    performing, by the client and the server, a message transmission/reception synchronization process to share non-received messages before the connection between the client and the server is interrupted;
    performing, by the client and the server, a message transmission/reception process after the message transmission/reception synchronization process is done;
    comparing, by the server, the received credential of the client with the credential of the server to identify the client;
    identifying, by the server, a serial number for a last message received from the client before the connection interruption;
    transmitting, by the server, the identified serial number to the client; and
    retransmitting, by the client, non-received messages to the server, wherein the at least one message includes a first message and a second messages, and wherein a first serial number is assigned to each of all of the packets of the first message while a second serial number different from the first serial number is assigned to each of all of the packets of the second message, or a different serial number is assigned to each of all of the packets of the first message and the second message.

2. The network communication method of claim 1, further comprising:
    comparing, by the server, the received credential of the client with the credential of the server to identify the client;
    identifying, by the client, a serial number for a last message received from the server before the connection interruption;
    transmitting, by the client, the identified serial number to the server; and
    retransmitting, by the server, non-received messages to the client.

3. The network communication method of claim 1, further comprising:
    transmitting, by the server, a session transfer message to a second server, the session transfer message indicating that the server will transfer a session to the second server, the session transfer message including the credential and the serial numbers;
    transmitting, by the second server, an acknowledge message to the server;
    transmitting, by the server, an access server change message to the client, the access server change message instructing the client to access the second server;
    connecting, by the client, to the second sever and sharing a new symmetric key with the second server;
    transmitting, by the client, the credential of the client to the second server;
    performing, by the client and the second server, a message transmission/reception synchronization process to share non-received message before the connection interruption between the client and the server;
    performing, by the client and the second server, a message transmission/reception process after the message transmission/reception synchronization process is done;

comparing, by the second server, the credential received from the client with the credential received from the server to identify the client;

transmitting a serial number for a last message received from the server to the client; and retransmitting, by the client, non-received messages to the second server.

4. The network communication of claim 3, further comprising:

transmitting, by the client, a serial number for a last message received from the server before the connection interruption to the second server; and retransmitting, by the second server, non-receiver transmission data to the client.

\* \* \* \* \*